No. 649,140. Patented May 8, 1900.
H. M. PLUMMER.
WEIGHING APPARATUS.
(Application filed July 17, 1899.)

(No Model.) 4 Sheets—Sheet 1.

Witnesses.
Inventor:
Henry M. Plummer

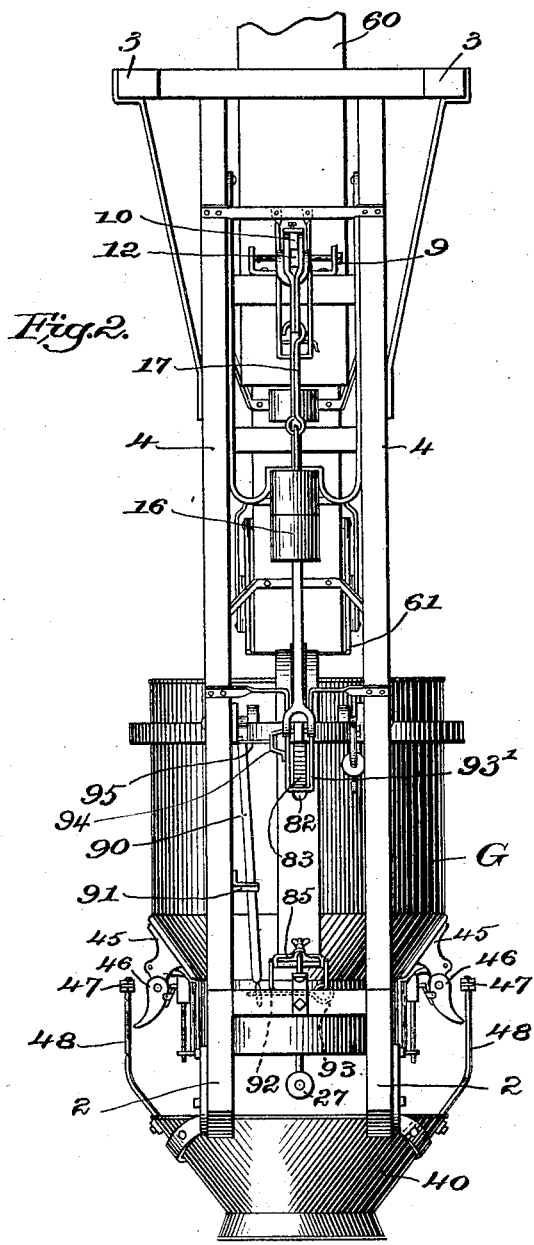

No. 649,140. Patented May 8, 1900.
H. M. PLUMMER.
WEIGHING APPARATUS.
(Application filed July 17, 1899.)

(No Model.) 4 Sheets—Sheet 3.

Witnesses.
Thomas J. Drummond
Adolf C. Kaiser

Inventor.
Henry M. Plummer
By Crosby Gregory
attys.

No. 649,140. Patented May 8, 1900.
H. M. PLUMMER.
WEIGHING APPARATUS.
(Application filed July 17, 1899.)
(No Model.) 4 Sheets—Sheet 4.

Witnesses.
Thomas J. Drummond.
Adolf C. Kaiser.

Inventor.
Henry M. Plummer.
by Crosby Gregory Attys.

THE NORRIS PETERS CO., PHOTO-LITHO., WASHINGTON, D. C.

UNITED STATES PATENT OFFICE.

HENRY M. PLUMMER, OF NEW BEDFORD, MASSACHUSETTS.

WEIGHING APPARATUS.

SPECIFICATION forming part of Letters Patent No. 649,140, dated May 8, 1900.

Application filed July 17, 1899. Serial No. 724,046. (No model.)

*To all whom it may concern:*

Be it known that I, HENRY M. PLUMMER, of New Bedford, county of Bristol, State of Massachusetts, have invented an Improvement in Weighing Apparatus, of which the following description, in connection with the accompanying drawings, is a specification, like letters and figures on the drawings representing like parts.

This invention relates to weighing apparatus; and the object of the invention is to provide a novel appliance of this character for accurately and rapidly weighing different kinds of substances—such as oats, wheat, &c.—and which can be utilized to discharge from the load-receiver or bucket successively-weighed lots of material into bags or other receptacles; and the preferred embodiment of the apparatus will be hereinafter set forth, and it includes certain controlling mechanisms for the different parts, whereby the proper operation thereof is positively assured.

Figure 1:
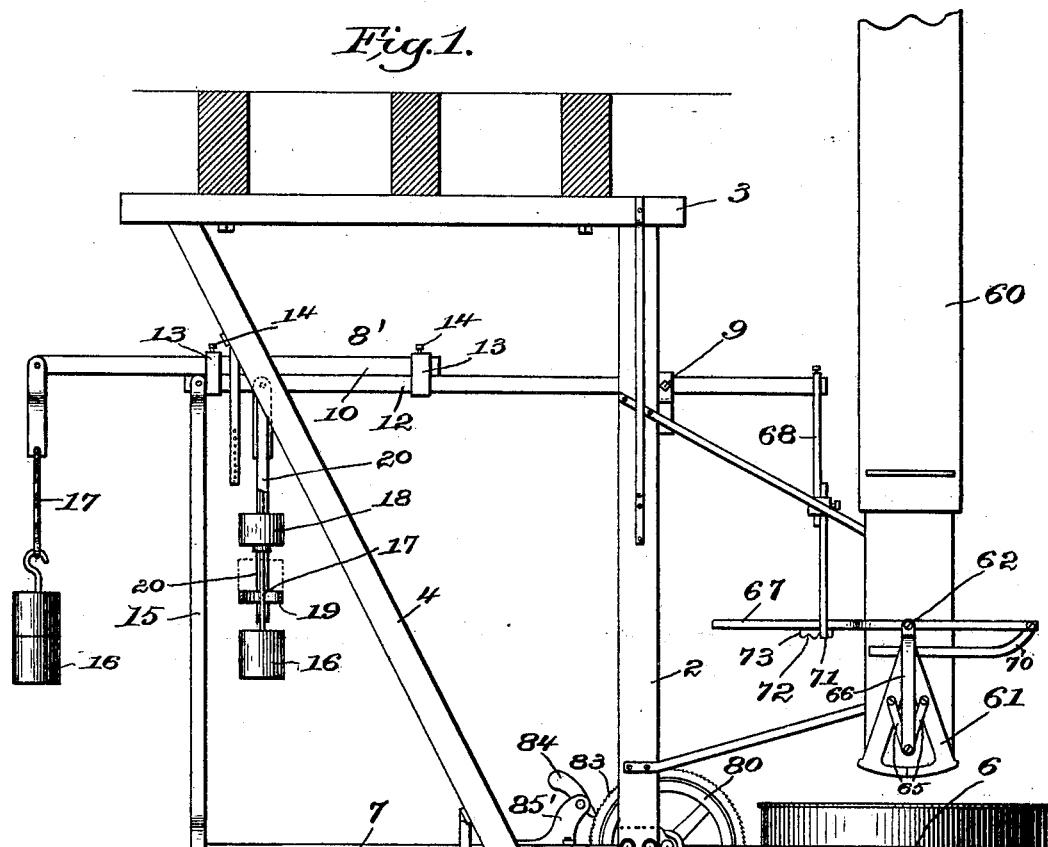
Figure 6:
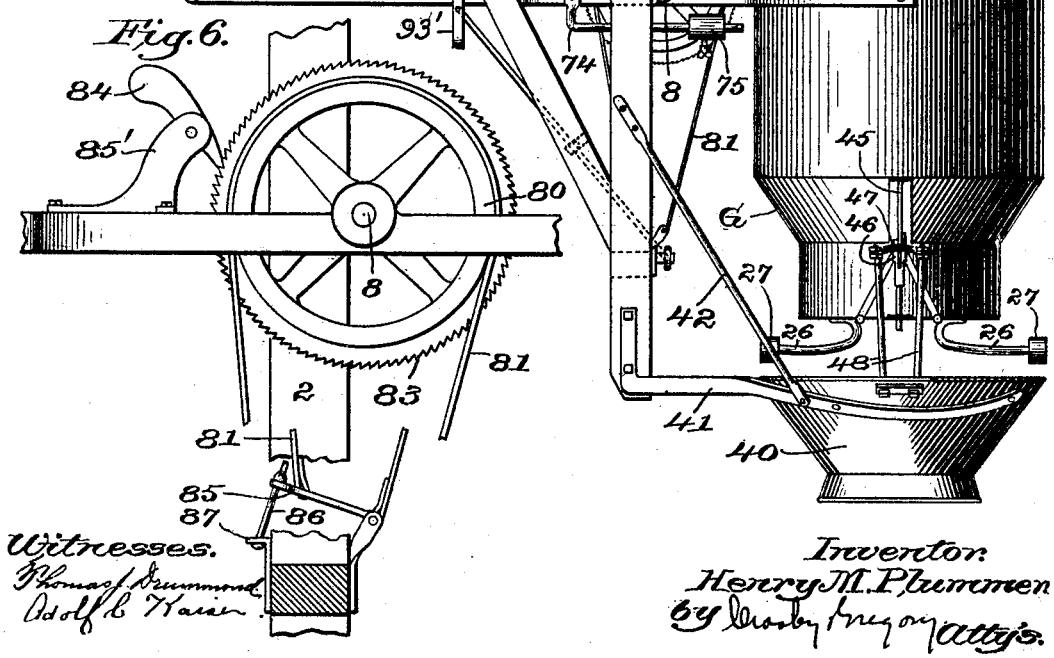
Figure 3:
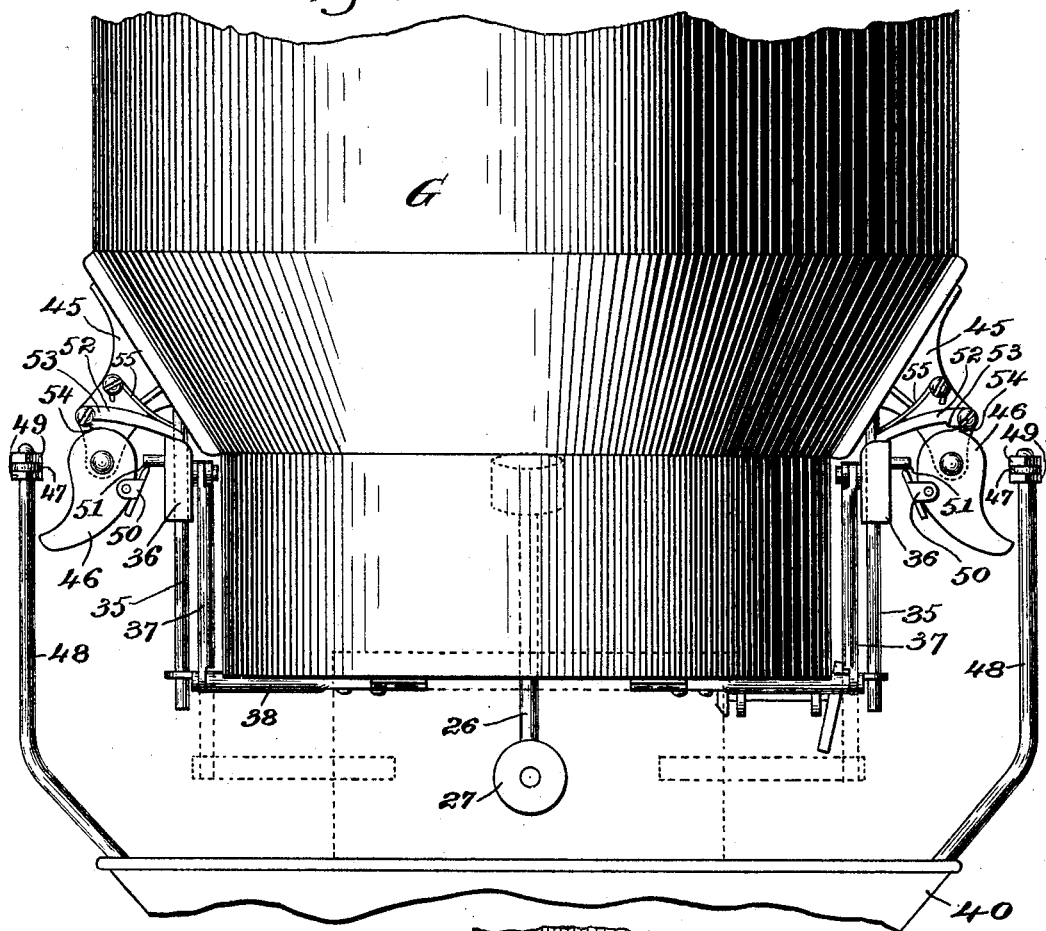
Figure 7:
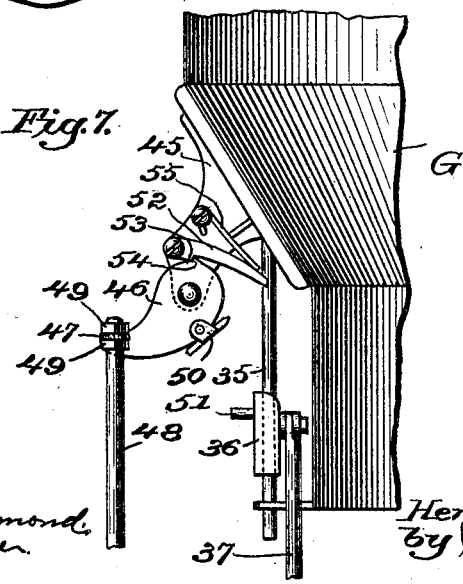
Figure 4:
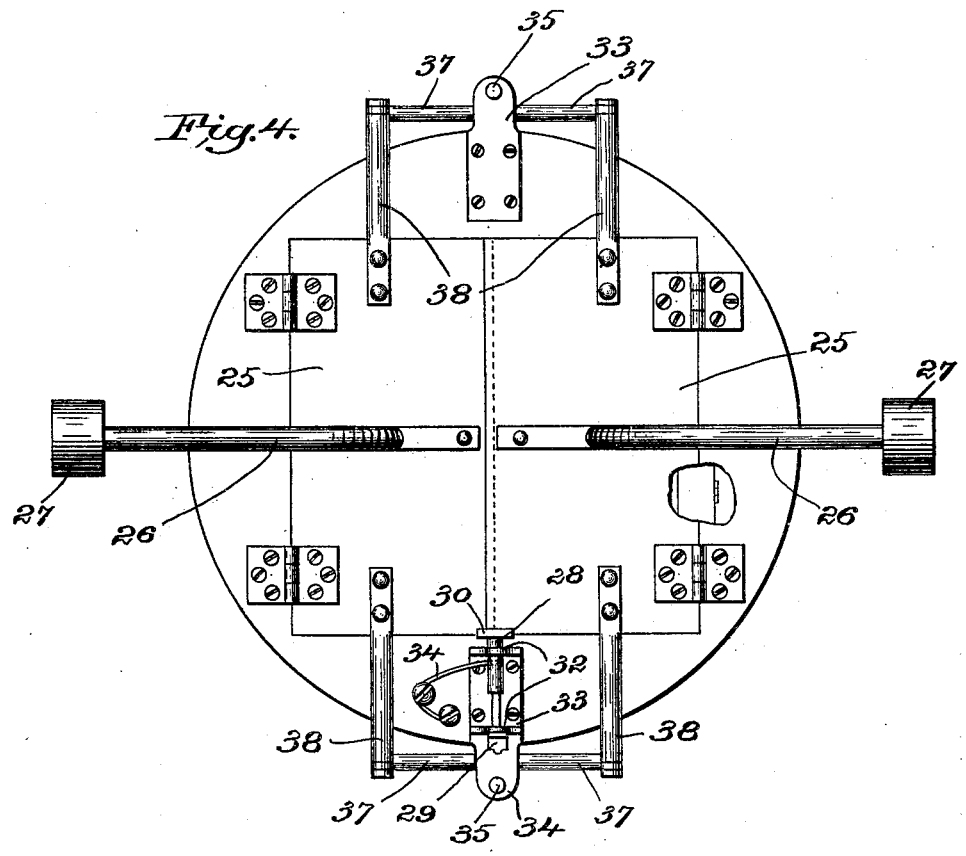
Figure 5:
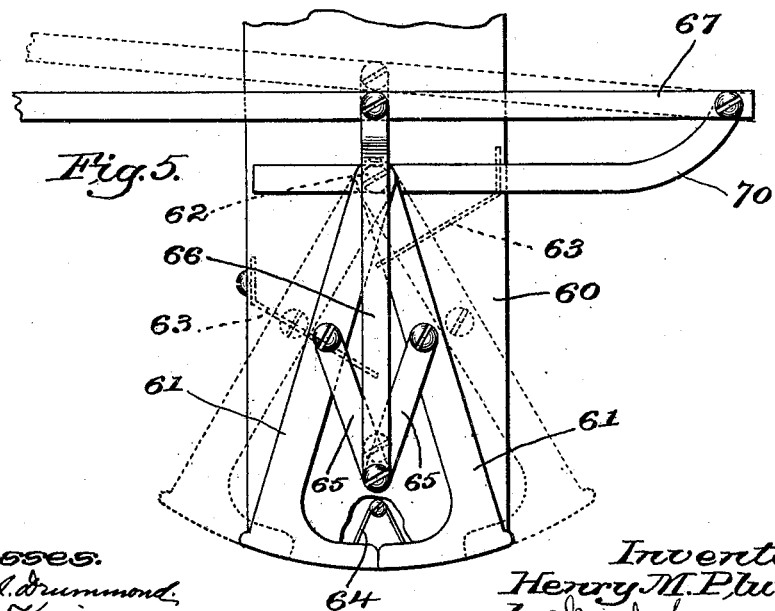

In the drawings, Figure 1 is a side elevation of a weighing apparatus, illustrating a convenient embodiment of the invention. Fig. 2 is a rear elevation of the same. Fig. 3 is a front elevation of the lower part of the bucket and the discharging-throat thereof and the controlling mechanism for the bucket. Fig. 4 is an under side view of the bucket. Fig. 5 is a side view of the supply-valve mechanism. Fig. 6 is a detail covering more clearly the retarding mechanism preventing the too-rapid ascent of the load-receiver. Fig. 7 is a similar view of the locking means for holding the bucket down until the load is fully discharged.

The framing for supporting the different parts of the apparatus may be of any suitable character, and it is represented as consisting of the uprights or vertical posts 2, disposed substantially in parallelism and of some considerable length and connected in some convenient manner to the ceiling-beams 3 and strengthened by means of the diagonal braces 4, connected also to the ceiling-beams and to said uprights 2, near the lower end thereof.

The weighing mechanism may be of any suitable form, and it is illustrated as consisting of a load-receiver or bucket G in the form, substantially, of a hopper, pivotally suspended, as at 6, from the bifurcated or yoke end of the main beam 7, which beam is loosely mounted upon the transverse rock-shaft 8, hereinafter more particularly described, and supported by bearing-boxes or otherwise secured to the uprights or timbers 2. As hereinbefore set forth, the beam 7 is in the nature of a main beam, and it supports the load-receiver G.

The auxiliary beam is denoted by 8' and is pivotally supported, as at 9, by the uprights 2 and, as will hereinafter appear, serves as a convenient device for opening the valve mechanism which controls the supply of material to the load-receiver or bucket G. The beam 8' is represented as consisting of two sections, as 10 and 12, connected by the collars or bands 13, surrounding both sections and disposed at relatively-remote distances. By this means the section of the beam 10 can be adjusted relatively to its companion 12, if desired, either inward or outward to compensate for any inequality of the counterpoise between the beam mechanism and the bucket, and when the proper adjustment is secured set-screws 14 upon the bands 13 can be caused to engage the beam-section 10. The auxiliary beam 8' is connected with the main beam 7 by means of the rod or bar 15, conveniently fitted to these parts, the rod being directly united to the normally-fixed section 12 of the upper or auxiliary beam, and by this means the movement of the two beams in unison is assured. Both sections of the beams are provided with counterweights, as 16, secured to the bars 17, which weights are adapted to counterpoise the load in the bucket G, and when the beams 7 and 8, which are disposed in parallelism, assume a horizontal position, as represented in Fig. 1, this will indicate that the load has been made up, and it can be suitably discharged, hand-controlled means being illustrated and hereinafter described to empty the bucket.

The upper counterweight of the right-hand bar 17 is denoted by 18, and at the commencement of operation it rests upon the stop 19, as shown by the dotted lines in Fig. 1, and is represented as consisting of a ring secured to the bracket-arms 20, fixed in turn to the framing. At a suitable point in its length the rod 17 is furnished with a projection, herein shown as annular, which on the ascent of the bucket and the corresponding ascent of the right-hand bar through the intermediate connections with the beam is adapted to engage and to lift the weight 18 at a predetermined point in the descent of the bucket, said pick-up weight 18 being normally disconnected from the beam mechanism, thereby to permit the proper descent of the bucket.

The means for controlling the discharge of the load may be of any suitable character, and it is illustrated as consisting of two closers or flaps 25, of substantially duplicate construction, hinged to the bucket at opposite sides of the load-discharging opening and to the under side of which the curved arms 26 are secured, said arms being provided with weights 27, which serve when the load is fully discharged to shut the closers or flaps in unison.

The means for locking the closers 25 shut may be of any suitable type, but it is represented as including a latch or sliding bolt 28, having a finger-piece 29, by which it can be manipulated, and a head or working portion 30, adapted to engage under the two closers when they are shut, as represented clearly in Fig. 4, the bolt sliding in registering openings formed in the parallel lugs or ears 32, extending downward from the bracket 33, secured to the under side of the bucket, and the bolt is held in its working position (represented in said Fig. 4) by means of the spring 34, the free end of which passes through a transverse aperture in the bolt at a suitable point in its length and which is secured to the bucket in adjacence to said bolt. When the load is ready to be discharged, the bolt will be retracted or drawn back, so that the weight sustained upon the closers can force the same open to secure a discharge of the material.

The bracket 33, which carries the locking-bolt, has a mate at the opposite side of the bucket, which I also designate 33, and these brackets receive the lower ends of the guide-rods 35, the upper ends of said guide-rods 35 being secured to the lower end of the bucket and constituting a simple means for sustaining the actuating-blocks 36, which slide vertically thereon and which are connected pivotally, preferably, to the rods 37, the rods being arranged in pairs at each side of the bucket and being jointed at their lower ends to the projections 38, extending oppositely and outwardly from the closers 25, a pair of rods being secured to each closer. The closers serve, in effect, for rendering operative certain means operable to lock the bucket against ascending movement during the discharge of the load and while the closers are open, and by thus locking the bucket against ascent the valve mechanism cannot be operated to permit the supply of material to the load-receiver, as the said valve mechanism is controlled through the intermediate beams.

The hopper or discharge-chute 40 is disposed below the bucket and is adapted to receive the material discharged therefrom and to direct the same into a suitable vessel, such as a bag, the mouth of which can be placed around the lower reduced end of the said discharge-chute 40. The hopper 40 is supported between the brackets 41, below the load-receiver, which brackets are fastened to the lower ends of the uprights 2 and are braced by the stay-rods 42, secured to the respective parts.

In connection with the discharge mechanism I provide effective means adapted to engage a fixed stop, thereby to prevent the ascent of the bucket until the load is fully discharged, and in the present case I provide two of these stops, and they are engageable by detents shiftably mounted upon the load-receiver at opposite sides thereof and set in operative position by means connected with the closers, although it is not essential, of course, that two of these controlling mechanisms be employed. Still the best result is obtained by using them.

To the opposite sides of the load-receiver the brackets or bearings 45 are secured and depend therefrom, and the detents are represented as pivotally supported by the brackets, and they are automatically thrown into engagement simultaneously with stops, as the strips 46', having openings at their opposite ends to receive the parallel and substantially-upright bars 48, located at opposite sides of the discharge-hopper 40, said strips being held in adjusted position by means of the holding and check nuts 49, in threaded engagement with the upper ends of the respective bars 48, and it will be understood that the free ends of the detents 46 are thrown against the under sides of the strips 46' by power derived from the opening-closers, and said shiftable detents are held in their working positions by suitable locking devices, a convenient type of which will be hereinafter set forth. The detents 46, which are substantially hook-shaped at their working ends, are provided upon their inner sides with pivoted fingers 50, adapted to be engaged by projections 51 upon the sliding blocks 36, to which I have hereinbefore referred.

On the opening of the closers or flaps 25 the blocks 36 will be drawn down in unison through the intermediate connecting-rods 37, which are united to the closers, and the projections 51 being in contact with the upper ends of the pivoted fingers 50 the detents 46 will be shifted into position to engage the stop 47, and during this motion the projections 51 will pass out of contact with the pivoted fingers 50. When the projections 46 are in their extreme shifted positions, they will be automatically locked, and for this purpose I have illustrated a pair of bolts, as 52, pivoted upon the brackets or bearings 45 and having offsets or projections 53, adapted to engage cooperating shoulders 54 upon the detents 46 when the latter have been shifted. On the ascent of the blocks 36 they will engage the tails or free ends of the bolts 52 and disengage the same from the projections 46, whereby the bucket will be released, and as it ascends the fixed stops, being abutments, act to return the detents to their primary position. (Represented in Fig. 3.)

To secure quick action of the bolts 52, they are spring-operated, springs, as 55, acting against the same and the springs being secured to the brackets which carry the bolts.

Any convenient means may be provided to supply the bucket G with material; but I have herein represented a chute 60, communicating with a suitable source of supply and controlled by a pair of valves, as 61, of substantially-duplicate construction, pivotally supported, as at 62, by the chute 60 and adapted to close toward each other, said chute containing internal suitably-disposed baffle-plates 63 and a guard-plate 64 of substantially inverted-V shape, adapted to overlap the discharge edges of the two valves when the same are shut, as shown clearly in Fig. 5. The valves are shut upon the descent of the bucket, and as they swing under the outlet of the chute itself they serve to reduce and then to finally cut off the stream of material, and to said valves the links 65 are pivoted, said links being united also to the lower end of a third link 66, pivoted at its upper end to the lever 67, which in turn is connected by the rod 68, consisting, preferably, of two united sections, to the extreme forward end of the auxiliary beam 8', and upon the descent of the load-receiver or bucket G the valves will be shut, and upon the ascent of the said load-receiver the rod 68 will be pulled upward and, acting against the lever 67, which is supported by the bearing 70 upon the chute 60, will also elevate said lever, and the links 65, serving in effect as a toggle, will be moved toward a dead-center horizontal line, thereby throwing the two valves or flaps 61 outward or open to permit the necessary supply of material to enter the bucket to make up the load therein.

The two-part rod 68 is provided at its lower end with a projection, as 71, adapted to fit in one of a series of circular seats 72 in the strip 73, secured to the under side of the lever 67, and by this means the parts can be adjusted relatively to each other.

The main beam 7 is provided with the angular arm 74, the longer portion of which is threaded to receive the adjustable poise-weight 75, by manipulating which any inequality in the poise can be regulated, said poise-weight being held in adjusted position by means of a set-screw.

Upon the emptying of the bucket (as it is very light the counterpoise materially overbalances the same) an automatic brake will be provided to retard or arrest the ascent of the bucket to a sufficient extent as not to dislodge or effect the delicately-poised parts, and while the brake may be of any convenient character it is represented as being of the friction type and as controlled by the action of the main or lower beam 7.

The friction braking mechanism includes in its construction in the form herein represented a wheel or pulley 80, fixed to the shaft 8, to which I have hereinbefore referred, and embraced by the friction brace or strap 81, fixed at its opposite ends to the framework and adapted to bear against the periphery of the pulley 80, so as to block the free rotation thereof, and this band or strap has a longitudinal slot 82, through which the ratchet 83 extends, said ratchet being secured to the pulley 80 and ordinarily being formed integral therewith, and the teeth of the ratchet are adapted to be engaged by the gravity-pawl 84, pivoted to the lug 85' upon the beam 7 to the left of its fulcrum. One end of the strap or band 81 (see Fig. 2) is connected to the plate 85, having an opening to receive the bolt 86, carried by the bracket 87 upon the framing, and by turning the nut on the bolt the tension of the strap can be regulated to vary its grip upon the surface of the pulley.

It will be understood that upon the descent of the load-receiver or bucket G it may be freely moved, the gravity-pawl 84 during this operation riding over the teeth of the ratchet 83. When, however, the bucket ascends empty, that part of the beam to which the pawl 84 is connected will move oppositely, and the pawl being in contact with the teeth of the ratchet will serve to rotate the same; but its rotation will be very slow, only as the operation of the pawl acting against the ratchet is blocked by the brake-strap 80, thereby retarding the beams and bucket.

It is desirable when the machine is not in use to lock the same and with the empty bucket down, as it will be understood that the ascent of the bucket controls the opening of the supply-valves, and for this purpose I have represented a locking-lever 90, pivoted to the bearing 91 upon one of the uprights 2, as indicated in Fig. 2, and connected with the sliding actuator 92, supported upon the framework and having a finger-piece 93, by which it can be readily operated backward and forward. The beam 7 extends through the loop 93', depending from the brace 4, and it has a guide 94 upon one side thereof, having a slot to receive the projection or pin upon the upper end of the locking-lever 90. When the bucket is down, as shown in Fig. 1, the actuating-bar 92 is thrust to what is illustrated as the left in Fig. 1, thereby oppositely moving the projection 95 and forcing it under the left-hand end of the beam 7, whereby said left-hand end cannot descend, and consequently the ascent of the bucket is not possible when the beam is thus locked.

The operation of the machine, briefly stated, is as follows: Normally the bucket will be up and the valves 61 will be wide open, thereby permitting the descent of the full volume of the supply of the chute 60 into the empty bucket, the closers or flaps 25 of which are closed and locked by the bolt 28. As the bucket commences to fill it will descend, and simultaneously the valves will be swung under the outlet of the chute 60, and this operation will be continued until the load is completed, at which time the supply will be cut off by the complete closure of said valves, and at this point an operator will place a bag-mouth about the discharge-hopper 40 and will operate the bolt 28 to effect the release of the two closers 25, which are then forced open by the weight of the material in the bucket, and in the manner hereinbefore set forth the bucket will be locked against immediate return movement by the automatic instrumentalities hereinbefore particularly described. When the bucket is released, it will be returned to its normal position by the falling counterweight 16, when the operation will be completed.

Having described my invention, what I claim, and desire to secure by Letters Patent, is—

1. In a weighing apparatus, the combination with weighing mechanism, including a bucket and beam mechanism, of a wheel, a strap-brake located to engage the wheel and having a slot, a ratchet on the wheel projecting through said slot, and a pawl connected to the scale-beam and adapted to engage said ratchet.

2. In a weighing apparatus, the combination with a weighing mechanism including a bucket, and with load-discharging means, of a stop supported independently of the weighing mechanism, a guide upon the bucket, a detent, a slide mounted upon the guide and located to shift said detent into position to engage the stop, and means connected with the load-discharging means for operating said slide.

3. In a weighing apparatus, the combination with a weighing mechanism including a bucket, and with load-discharging means, of a stop supported independently of the weighing mechanism, a guide upon the load-receiver, a detent, a slide mounted upon the guide and located to shift said detent into position to engage the stop, means connected with the load-discharge for operating said slide, and a pawl located to engage the detent when shifted and normally held in its inoperative position by said slide.

4. In a weighing apparatus, the combination with a bucket and a beam mechanism for supporting the same, of closer mechanism mounted upon the bucket, a guide carried by the bucket and provided with a slide, a stop supported independently of the bucket, a detent located to engage said stop and shiftable into working position by said slide, connections between the slide and the closer mechanism, and a pawl controlled by the slide and located to engage said detent when shifted.

5. In a weighing apparatus, the combination with a weighing mechanism, including a bucket and beam mechanism for sustaining the same, of a stop supported independently of the weighing mechanism, load-discharging means for the bucket, a guide carried by the bucket and having a slide, a detent supported by the bucket and provided with a pivoted finger adapted to be engaged by said slide, a spring-operated pawl located to engage the detent when the same is shifted, and connections between said slide and the load-discharging means.

6. In a weighing apparatus, the combination with weighing mechanism including a bucket, of a fixed stop supported independently of the weighing mechanism, a detent shiftable into position to engage said stop, a pawl located to hold the detent in its shifted position, and means connected with the closer for holding the pawl in its ineffective position while the closer is shut, and operable upon the opening of the closer to throw said detent into its effective position and simultaneously to release the pawl.

In testimony whereof I have signed my name to this specification in the presence of two subscribing witnesses.

HENRY M. PLUMMER.

Witnesses:
ROBERT A. TERRY,
FRANCIS A. BOOTH.